United States Patent [19]

Forberg et al.

[11] Patent Number: 4,844,248
[45] Date of Patent: Jul. 4, 1989

[54] ELASTICIZED GUSSETED DISH COVER, METHOD OF MAKING SAME AND ARTICLE OF DISPENSING

[75] Inventors: Elizabeth A. Forberg, Western Springs, Ill.; Ewald A. Kamp, deceased, late of Chicago, Ill., by Adele Kamp, heiress

[73] Assignee: First Brands Corporation, Danbury, Conn.

[21] Appl. No.: 38,861

[22] Filed: Apr. 15, 1987

[51] Int. Cl.⁴ .................. B65D 65/10; B65D 85/676; B31B 4/26; B31B 1/64
[52] U.S. Cl. .................. 206/390; 150/154; 493/189; 493/214; 493/244; 493/267
[58] Field of Search .................. 150/52 R, 55, 154; 206/390, 820; 215/317; 383/71; 220/90.4, 306, 305; 493/189, 214, 215; 243, 244, 267

[56] References Cited

U.S. PATENT DOCUMENTS

| | | |
|---|---|---|
| 291,022 | 1/1984 | Beaupied . |
| 409,354 | 8/1980 | Green . |
| 1,544,312 | 6/1925 | Gray . |
| 1,627,771 | 5/1927 | Dwork . |
| 1,633,988 | 6/1927 | Jones . |
| 1,858,139 | 5/1932 | Dailey ........................... 215/317 |
| 2,080,108 | 5/1937 | Brandstein ..................... 150/52 R X |
| 2,768,107 | 10/1956 | Magid ............................. 150/52 R |
| 2,905,581 | 9/1959 | Maxey . |
| 3,246,446 | 4/1966 | Powers .......................... 150/52 R X |
| 3,283,422 | 11/1966 | Nygard ........................... 206/390 X |
| 3,332,423 | 7/1967 | Whalen . |
| 3,375,969 | 4/1968 | Davis, Jr. ........................ 383/71 X |
| 3,768,230 | 10/1973 | Bruno ............................. 150/55 X |
| 3,860,003 | 1/1975 | Buell . |
| 3,862,614 | 1/1975 | Kovac ............................. 220/90.4 X |
| 4,081,301 | 3/1978 | Buell ............................... 156/164 |
| 4,561,108 | 12/1985 | Kamp ............................. 383/63 |
| 4,770,298 | 9/1988 | McFarland et al. ............. 206/390 |

Primary Examiner—Sue A. Weaver
Attorney, Agent, or Firm—Gary L. Wamer

[57] ABSTRACT

A gusseted dish cover formed from a flexible sheet material and an elastomeric matrerial having a constricted opening and a cross-section of a generally M-shaped gusset. A novel storage and dispensing means for such gusseted dish covers is also disclosed wherein the dish covers are placed on a center support member having the constricted opening and the elastomeric material positioned off the end of the support member.

35 Claims, 5 Drawing Sheets

ELASTICIZED GUSSETED DISH COVER, METHOD OF MAKING SAME AND ARTICLE OF DISPENSING

FIELD OF THE INVENTION

The instant invention relates to dish covers having an elasticized opening and formed of a flexible sheet material and elastomeric material. These dish covers are useful in food storage applications in replacement for film and wraps and are particularly well suited for use with food storage containers having difficult-to-cling-to surfaces.

BACKGROUND OF THE INVENTION

Food Storage is a problem in both home and commercial food preparation. Typically food is prepared well in advance of the time it is to be consumed and stored for a time prior to its use. Further, after a meal there will often be unconsumed food which is stored for future use.

The food storage containers customarily used to store food includes among other things dishes without covers. Dishes may be of many types and may have a substantially circular, rectangular, oval or eliptical and the like shaped openings. Although some of these dishes may be manufactured with fitted tops, many dishes do not have tops to prevent the contents from exposure to air, odors and to prevent the entry of particulate matter into the dish. In order to protect the dish's contents from air/odors and particulate matter it has been customary to use rectangular thermoplastic films to cover the dish's opening. The use of such films with respect to dishes has met with limited success due to the diversity in dish shapes and the diversity of materials from which dishes may be constructed. A common problem has been maintaining adherence of the film to the dish so as to maintain a reasonably controlled closure and maintain the film in contact with the dish.

Such a controlled closure is important in maintaining the freshness of food contained in the dish or in preventing accidental spillage of the contents by jarring or, e.g., by heating in a microwave oven, i.e. splattering. The ability of the film to adhere to the dish has been addressed in a number of commercially available film products. Cling additives have been introduced into such film compositions to improve their ability to adhere to dish surfaces and provide a controlled closure. Unfortunately, these cling additives are not effective on a wide range of surfaces and may exhibit different levels of adherence to the dish as a function of the temperature at which the dish is stored and the material employed for constructing the dish. In addition, these cling additives are not useful for some dishes formed of wood or certain plastics, since such cling additives are not generally effective in adhering to non-wetting surfaces.

Since the mechanism employed in providing adherence between thermoplastic films and a dish surface is not effective with all dish surfaces a need has developed to provide a more controlled closure means that is not dependent on the material from which the dish is constructed nor the temperature of the dish and its contents. Applicants have developed such a dish cover.

The general use of a dish cover itself is known in the prior art. U.S. Pat. No. 2,768,107 is representative of the heretofore known bowl/dish covers of the prior art. This patent describes a dish cover formed from a flat disc of thermoplastic material to which a tubular edging is secured by heat with pressure or by use of a cement or other adhesive. The tubular edging may contain an elastic cord, draw string or rigid ring. The tubular edging is attached to the flat disc by affixation at a time when both are linearly coextensive to provide for improved sealing of the flat disc and tubular edging. This cover is useful in the storage of food in dishes but is both difficult and expensive to make and, further, difficult to package. The formation of the flat disc sheet necessarily results in separate bowl covers that cannot be easily packaged in a convenient dispensing format.

Although the formation of dish covers formed from flat discs of thermoplastic material with sewn in elastic or an attached tubular edge section containing an elastic cord have utility, such have not heretofore found commercial success. The most widely used form of closure for dishes continues to be either a thermoplastic sheet film material or the enclosure of the entire dish in a plastic bag or other sealable container.

The instant invention solves the problem of commercial feasibility and technical acceptability by forming a dish cover of a rectangular flexible sheet material, preferably a thermoplastic film material, having an elasticized opening being generally characterized as a gusseted dish cover. The resulting gusseted dish covers may be formed in a continuous operation that avoids the need for forming several components for later assembly. Further, the gusseted dish cover may be combined on a center support to form integrated dish covers and dispenser.

SUMMARY OF THE INVENTION

The instant invention relates to a gusseted dish cover formed from a rectangular-shaped blank of flexible sheet material, preferably a flexible thermoplastic sheet or film material, having affixed to the top and bottom edges thereof an elongated elastic material bonded to said flexible sheet material. The elastic material is affixed to the flexible sheet material under tension to provide elongation of the elastomeric material, preferably 100% to 300% elongation of the elastic-material over the length of the elastic material under relaxed condition. The rectangular-shaped blank of flexible sheet material, preferably a thermoplastic sheet material, with affixed elastic material is formed into a gusseted dish cover having said top and bottom edges substantially aligned and the center line of said sheet material being substantially aligned above with top and bottom edges to form in cross-section a generally M-shaped gusset at the sealed lateral edges and across the gusseted dish cover. The gusseted dish covers are preferably manufactured in a continuous fashion and beneficially packaged in a dispensing manner by forming an article comprising an integrally formed dish cover(s) and dispenser means having multiple gusseted dish covers, as above described. The instant gusseted dish covers are characterized by a contracted opening formed by the top and bottom edges of the flexible sheet material sealed at the lateral edges and having affixed elongated elastomeric material which when not under tension forms the contracted opening characterized by a corrugated surface where the elastomeric material is affixed to the flexible sheet material. During manufacture of the gusseted dish covers the covers are under tension and are spirally wound on a center support with the contracted opening of each gusseted dish cover being placed in a position after the end of the center support in a outwardly spiral direction whereby the contracted opening of each gusseted dish cover contacts itself or another gusseted dish cover and said elastomeric material is under substantially no tension in its storage after the end of the center support and the elastomeric material is preferably under zero elongation.

BRIEF DESCRIPTION OF THE DRAWINGS

FIG. 8 is a perspective cross-sectional view of the article of FIG. 6

DETAILED DESCRIPTION OF THE INVENTION

Figure 1:
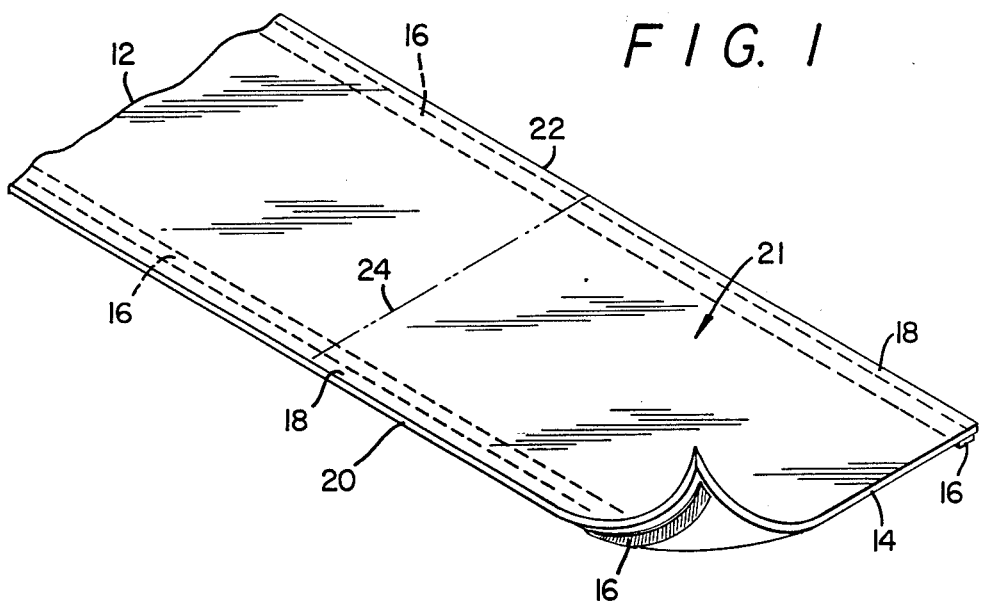
FIG. 1 depicts a perspective view of a continuous flexible film and affixed elastomeric material.

The instant invention related to gusseted dish covers and an integrally formed article for the storage and dispensing of such dish covers. The gusseted dish cover of this invention comprises a rectangular-shaped blank of flexible sheet material, preferably a thermoplastic sheet material, having affixed to top and bottom edges an elastomeric material bonded, preferably thermally bonded, to said flexible sheet material. The elastomeric material is bonded under tension to provide elongation of the elastic-material as compared to the length of the elastomeric material when at a relaxed state, i.e., when under no applied tension. The rectangular-shaped blank of flexible sheet material with the affixed elastomeric material is formed into a gusseted dish cover having substantially aligned top and bottom edges and a center gusset formed at a line medial to and generally parallel to the top and bottom edge of said sheet material to form in cross-section a generally M-shaped fold gusset as viewed at said lateral edges and across said gusseted dish cover.

The method for forming the dish cover according to the invention comprising:

(i) providing a generally rectangular sheet of flexible film having a top edge, a bottom edge and two lateral edges;

(ii) affixing under an elongated state an elastomeric material to the top edge and bottom edge of the generally rectangular sheet of flexible film;

(iii) folding the sheet downward along a first line extending between the lateral edges and medial to and generally parallel to the bottom edge and top edge;

(iv) folding the sheet upward along each of two second lines spaced on either side of and proximate to the first line;

(v) forming a gusseted dish cover by folding downwardly the top and bottom edges and forming in cross-section a generally M-shaped gusset; and (vi) sealing each lateral edge where it adjoins itself.

As will be readily apparent to one skilled in the art, the above steps occur substantially concurrently and the order of the above steps may be changed to provide for processing variables. For example, the formation of the gusset may be provided prior to affixing the elastomeric material to the top and bottom edge.

The aforementioned gusseted dish cover is advantageous in its design by providing both an easily packaged dish cover and also characterized by a novel interaction between the gusseted dish covers when packaged to form a dispensing article having the dish covers in an interlocking arrangement. This novel storage and dispensing article comprises an integrally formed dish cover and dispenser means comprising gusseted dish covers characterized as above described having top and bottom edges having affixed thereto an elastomeric material which when not under tension forms a contracted opening having a corrugated surface where the elastomeric material is affixed to the flexible sheet material, whereby the gusseted dish cover(s) is spirally wound on a center member with the contracted corrugated opening of each gusseted dish cover being placed in a position after the end of the center member in an outwardly spiral direction. In this manner the contracted corrugated opening of the gusseted dish cover contacts itself or another gusseted dish cover in an interlocking arrangement and the elastomeric material of the contracted opening is under substantially zero elongation over the relaxed state. In a preferred embodiment of the invention, the flexible sheet material is a thermoplastic film, the elastomeric material is an elastomeric thermoplastic material and such are thermally bonded.

Figure 2:
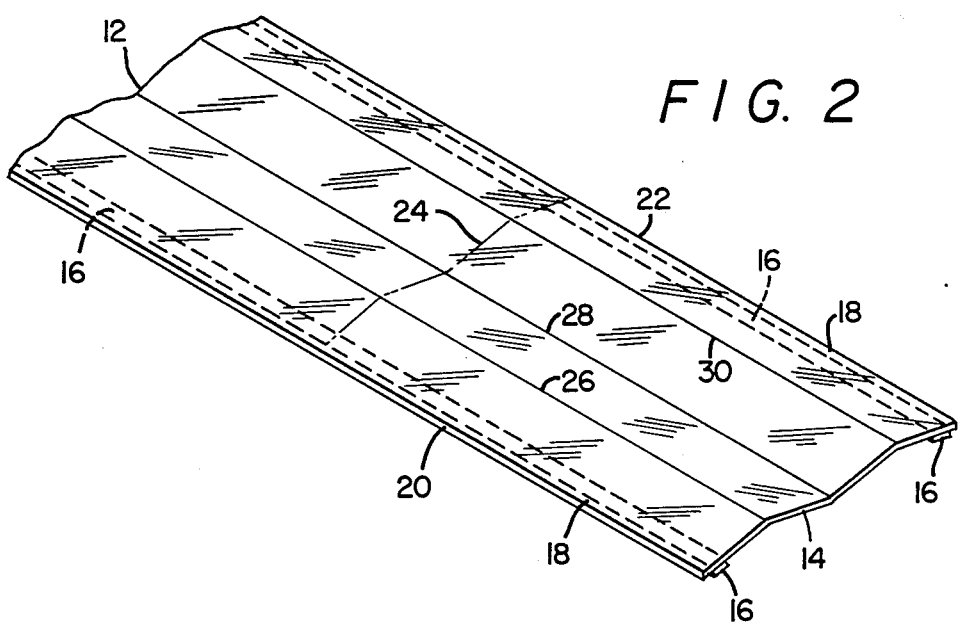
FIG. 2 depicts a perspective view of a continuous flexible film and affixed elastomeric material having initial folds for forming a gusseted dish cover.

FIG. 1 and FIG. 2 illustrate the flexible sheet material and the preliminary folds in the flexible sheet material made in forming the gusseted dish cover. FIG. 1 is a plane view of flexible sheet material 21 shown as a continuous sheet having bottom edge 20, top edge 22, lateral edges 12, 14 and 24 (shown at phantom-line) and elastomeric material 16 affixed thereto at 18 distance from the top and bottom edges. The gusseted dish covers are preferably manufactured in a continuous fashion from a continuous flexible sheet material and are not completely separated from each other until a predetermined number have been formed and packaged. Accordingly, lateral edge 24 is shown in phantom and coincides with the leading edges of the next cover and serves as a connective edge between respective dish covers. This connective edge will generally comprise a perforated edge whereby a user can easily separate one gusseted dish cover from the dispenser as it is needed. The point at which the elastomeric material is affixed to flexible sheet material 21 is not critical. FIG. 1 shows elastomeric material 16 recessed from bottom edge 20 and top edge 22 by distance 18 to provide a slight flap after the elastomeric material for use in providing a tab by which the dish cover may be grasped more easily. This may not be most beneficial when the contents of the dish are hot. The distance 18, if any, is selected depending on the design of the bowl cover. For example, it may be desirable to emboss or place ridges on the flexible sheet material near the edges for easy handling or improved appearance.

The flexible sheet material shown in FIG. 1 is folded as shown in FIG. 2 to form multiple folds. FIG. 2 shows folds at 26, 28 and 30 for formation of an M-gusset center fold, although the number of folds may be more or less depending on the size of the dish cover and the desired appearance of the dish cover.

Figure 3:
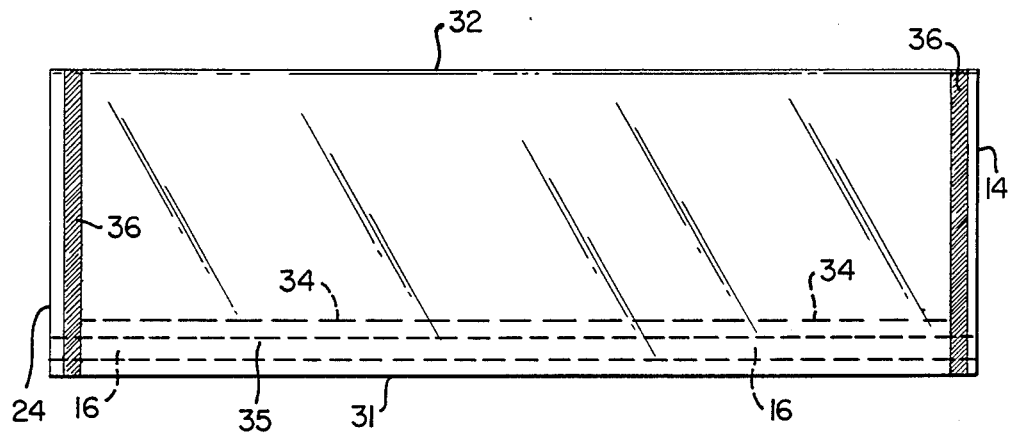
FIG. 3 is a side elevation view of a gusseted dish cover having the gusset formed.
Figure 4:
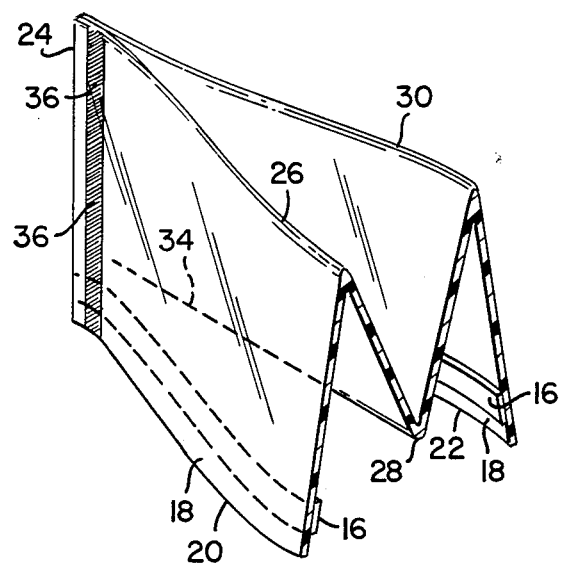
FIG. 4 is a perspective cross-section view of a partially opened gusseted dish cover showing in cross-section an M-shaped gusset.
Figure 5:
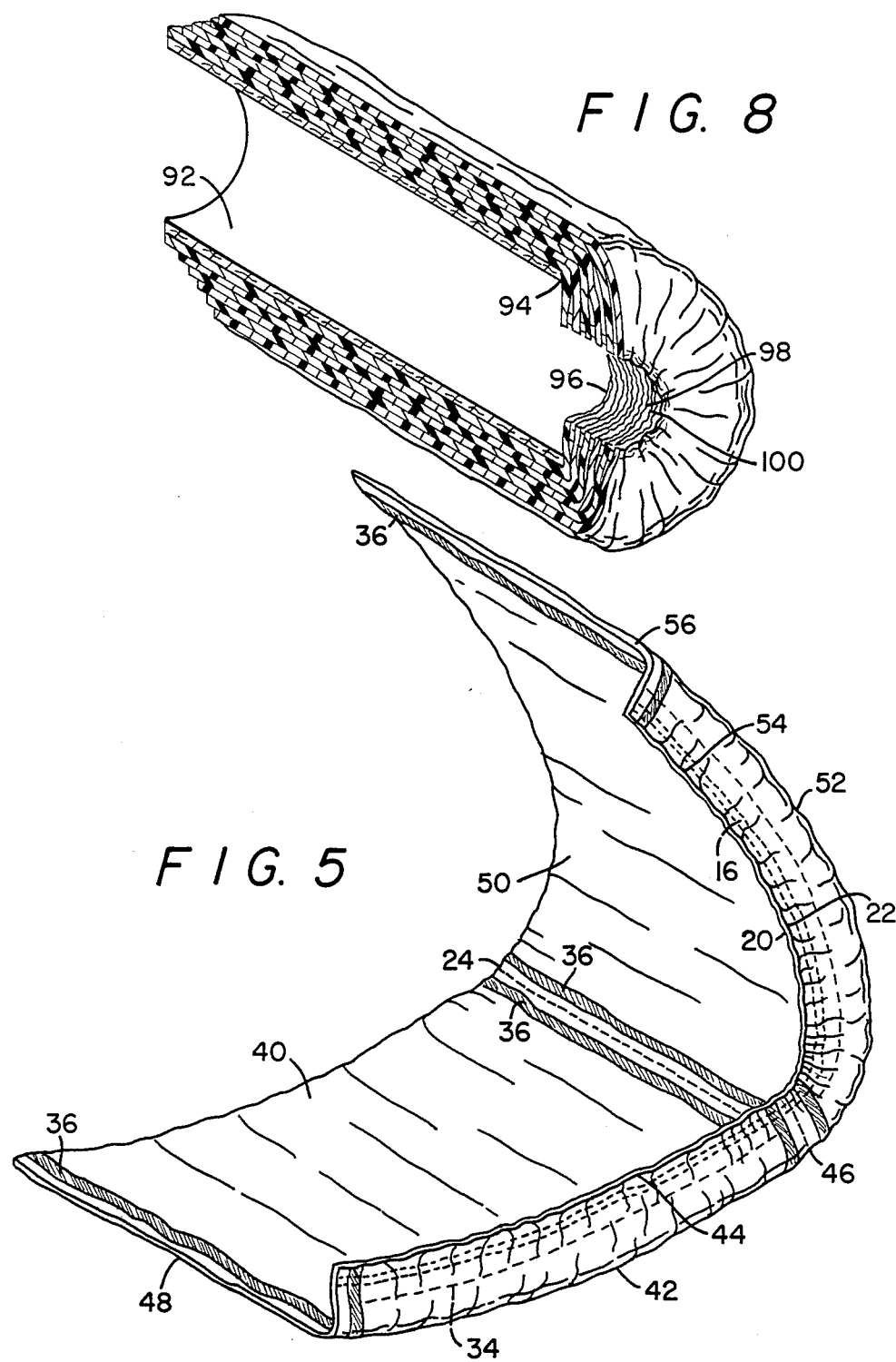
FIG. 5 is a perspective view of two gusseted-dish covers formed in continuous operation and connected at a perforated edge with the elastomeric material in a relaxed state.

In forming the gusseted dish cover shown in FIG. 3 and FIG. 4 bottom edge 20 and top edge 22 are substantially aligned and folds 26 and 30 are substantially aligned and abutted at 32. Fold 28 is extended between lateral edges 14 and 24 and substantially medial to and generally parallel to the bottom and top edge and is folded downwardly at 34 preferably above the substantial inside alignment at 35 of elastomeric material 16 and bottom edge 20 and top edge 22 at 31. The lateral edges are sealed at 36 (shown as a bar seal), preferably by thermal sealing. The resulting gusseted dish cover is characterized by a M-shaped gusseted body having a cross-section as shown in FIG. 4. The general M-shaped gusset is defined by the surface of folded flexible sheet material 21 starting at bottom edge 20 to fold 26, then to fold 28, then to fold 30 and then to top edge 22. FIG. 4 depicts an M-shaped gusset, although the single fold at 28 may be multiple folds as will be appreciated by one skilled in the art, and a pleated gusset may be formed. The substantial alignment of the top edge and bottom edge form the opening of the dish cover which contracts with the release of tension from lateral edges after the lateral edges have been sealed. The contraction of the elastomeric material for two dish covers connected along a perforated edge 24 to 46 is shown in FIG. 5. The contraction of the elastomeric material upon the release of tension at the lateral edges causes contraction of the substantially aligned bottom edge 20 and top edge 22 which turn inwardly in the manner shown in FIG. 5 and form a corrugated surfaces 42 and 52 along the bottom edge 20 and top edge 22 which now are sealed at the lateral edges at 36 and form the opening of the dish cover comprising a contracted openings 44 and 54 having a variable opening determined by the relaxed length of the elastomeric material and the length of the flexible sheet material (double layered with gusset at 40 and 50) as measured between the sealed lateral edges. The percent elongation of the elastomeric material, at 16, and the distance between the sealed lateral edges 36 may be selected to provide a wide range of openings for the gusseted dish covers to enable use with a wide range of dish sizes. The preferred correlation of the selection of the gusseted dish cover to the dish will be such that the dish to be covered is larger at the point where the contracted opening of the dish cover contacts the dish than the contracted opening and yet the largest portion of the dish over which the dish cover must be placed is smaller than the maximum size of the contracted opening when fully opened, i.e., when the elastomeric material is fully elongated to the distance between the lateral edges.

The aforementioned gusseted dish cover is formed from a flexible sheet material and an elastomeric material. The selection will be related to the selected use of the dish cover, e.g., freezer cover, refrigerator storage cover, microwave cooking cover and the like. The flexible sheet material may be any flexible sheet material joinable to itself or other sheets and may include flexible films of thermoset or thermoplastic polymeric materials, such as cellophane, saran, polyolefins, and the like. The flexible sheet material is preferably a thermoplastic sheet or film, including polyethylene, polypropylene, polyvinyl chloride, polyvinylidene chloride, nylon, polyester, polyvinylacetate, polymers of ethylene-vinyl alcohol and copolymers of vinyl and vinylidene chloride and the like. As will be known to one skilled in the art, the flexible sheet material may be a single film or a coextruded or laminated multilayer film. Representative of laminated films employable in fabrication of the instant dish cover is the description in U.S. Pat. No. 4,561,108 at column 13, line 43 to column 15, line 50, said passage incorporated herein by reference. In addition to their use as components in multilayer films, the separate thermoplastic films described in U.S. Pat. No. 4,561,108 may also find use as single layer films and be employed as the flexible sheet material. The thermoplastic sheet material is generally polyethylene film, such as commonly employed in the art to manufacture sandwich bags and the like, owing to its cost and wide range of use. When the dish cover is intended for use in a particular application, e.g. microwave cooking, the preferred polymer may be other than polyethylene since particular cold or heat related properties may be desirable.

The thermoplastic sheet material may be embossed with a pattern over its entire surface, embossed only at the bottom or top edges or embossed on any selected portion of the thermoplastic sheet material. If desired, gripper ridges may be placed adjacent the top and bottom edges to facilitate improved ease of use of the dish cover.

The elastomeric material may be any material that undergoes elongation when tension is applied in opposing directions and then returns to substantially its starting length when the tension is released. For purpose of the instant gusseted dish covers an elongation of greater then 100%, preferably 100% to 300%, of the relaxed length is normally adequate. Materials having lower or higher elastic limits may be employed and may be selected on the particular shape of the dish to be covered. For example, if a dish with a large top portion and a relatively small bottom portion is to be covered, the elastomeric material may beneficially be selected to have an elongation of greater than 200%, depending on the relative sizes of the top or bottom portions of the dish. The preferred elastomeric materials are thermoplastic elastomeric rubbers because such may be thermally sealed to thermoplastic sheet or film materials. One such thermoplastic rubber is KRATON ™ thermoplastic rubbers available from Shell Chemical Company. These thermoplastic rubbers (described in publication SC:68-86, published July, 1986 by Shell Chemical Company, incorporated herein by reference) are sold under the designations KRATON ™ D and KRATON ™ G and are characterized as (1) linear A-B-A block type: styrene-butadine-styrene (S-B-S), and styrene-isoprene-styrene (S-I-S); and (2) styrene-ethylene/butylene-styrene (S-EB-S), respectively. Other elastomeric materials of the styrene-butadiene, styrene-isoprene and styrene-ethylene/propylene types may also be employed. Alternatively, an elastomeric material may be employed and coated with a heat-activated adhesive coating on at least one side. Natural rubbers, available from Easthampton Rubber Thread Company and identified as L-1900, may also be employed with an adhesive. The joining of the flexible sheet material and the elastomeric material is preferably by thermal sealing but may also be by gluing, fusing, use of double sided transfer tape (e.g., pressure sensitive), and the like.

The thickness of the flexible sheet material and elastomeric material depends on the selection of the respective materials and on the intended use of the dish cover. Polyethylene thermoplastic films having a thickness between about 0.5 mils (0.013 mm) and about 2 mil (0.052 mm) are suitable for most applications and are typically selected at a thickness between about 0.6 mils (0.014 mm) and about 1.5 mils (0.021 mm). The thickness of the elastomeric material is related to the particular elastomeric material selected, the percent elongation desired and the selected flexible sheet material, but in most instances will be between 1 mil (0.025 mm) and about 5 mils (0.125 mm). The aforementioned thicknesses are provided for guidance, since the actual thickness will depend on the selected use for the dish cover, the flexible sheet material and the elastomeric material.

The lateral edges are joined, i.e., sealed, and such is preferably done by thermally sealing the lateral edges with a bar seal as shown in FIG. 4 at 36. When the flexible sheet material is a thermoplastic material the area to be sealed at the lateral edges are joined by heating the area to be joined to soften or melt the thermoplastic to fuse the adjacent layers together, such as with a hot knife or bar to form a bar seal, fused bead seal or by other conventional means. In the instant invention a perforated interface is preferably provided to connect two or more gusseted dish covers in a continuous fashion. The perforated interface between dish covers may be formed by use of a hot knife with a serrated edge or other suitable means for forming perforations.

Figure 6:
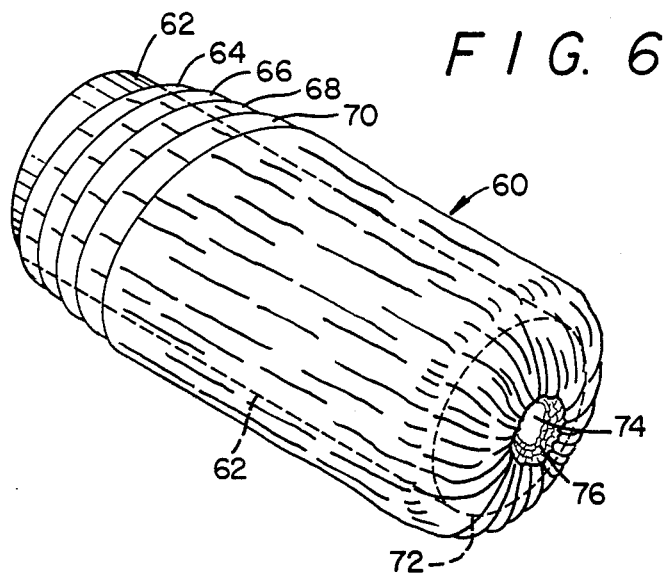
FIG. 6 is a perspective view of multiple gusseted dish covers stored in an interlocking fashion to form dish covers and a dispensing article.
Figure 7:
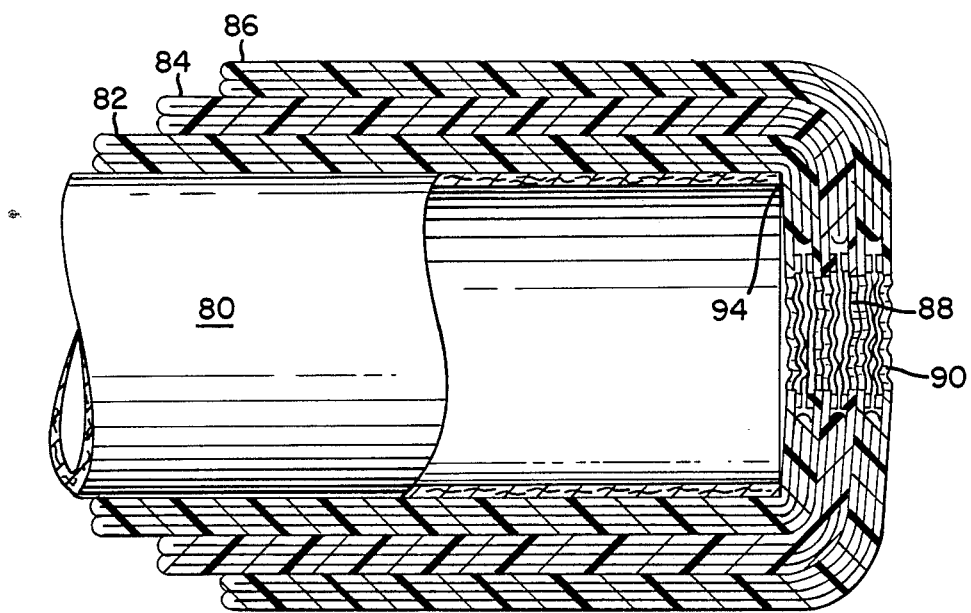
FIG. 7 is a cross-sectional view of the article of FIG. 6 showing the nesting effect of the corrugated surface of the contracted opening.

The gusseted dish covers are preferably formed in a continuous manner and connected in a continuous fashion at a perforated edge. A selected number of such connected gusseted dish covers may then be placed in a single package for sale. FIG. 6 shows a selected number of gusset dish covers formed into an integrally formed storage/dispensing article 60. The dish covers are placed on support member 62 such that the elastomeric material of the dish cover is in a substantially relaxed state by placement off the end 72 of support member 62. The support member is typically a hollow cardboard or plastic tube of the type generally employed in the art for the wax paper, food wraps, aluminum foils and microwave cooking wraps. By placement of the elastomeric material off the end of the support member opening 74 is formed whereat the elastomeric material is placed under minimal tension, i.e., the elastomeric material has minimal or zero elongation, and the corrugated surface 76 of a dish cover contacts its own corrugated surface or that of another dish cover. This substantially relaxed condition of the elastomeric material is important in preventing fatigue or hysteresis of the elastomeric material which would otherwise result from long storage periods under tension. Each dish cover is placed on the support member 62 over the previous dish cover by placing the contracted opening adjacent the previous contracted opening's surface. The difference in the length of the contracted opening and the opposing edge of the dish cover (folds 26 and 30 of FIG. 2 at 32 of FIG. 3) results in a curvature of the dish cover as shown in FIG. 5. The thickness of the dish cover as each successive cover is outwardly placed on the support member results is a spiral lay down of the dish covers as shown at 64, 66, 68 and 70. FIG. 7 shows a cross-sectional view of the of the article of FIG. 6 having several dish covers on center support means 80 having end 94. FIG. 7 shows the contracted opening and the interaction of the contracted opening at corrugations 88 an 90. The interaction or interlocking effect of the corrugation of the contracted opening aids in preventing the layers 82, 84 and 86 of the dish covers from separating during storage. FIG. 8 shows a perspective view showing the nesting or interlocking effect of the corrugations 98 and 100 and the contracted opening 96. Further, the contracted opening is placed off the end of the support member 92 to form the opening 96.

Figure 9:
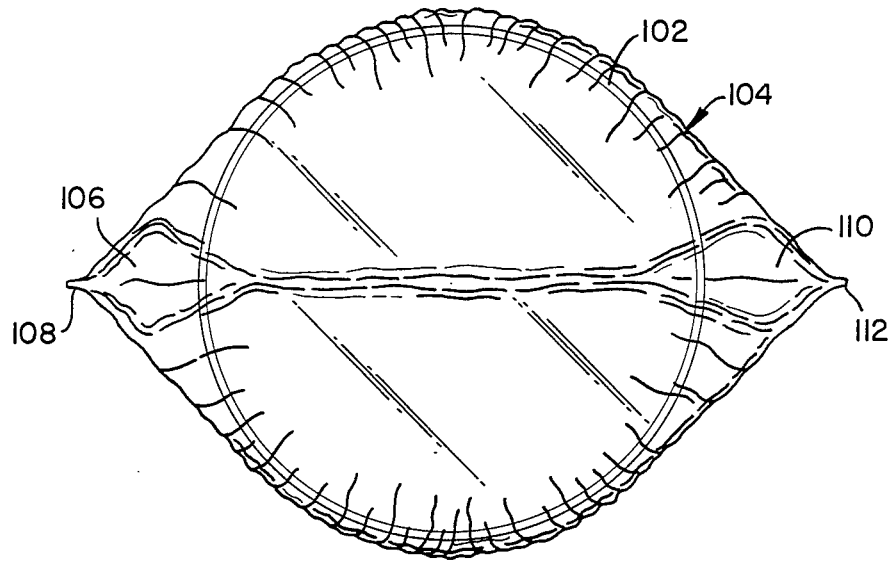
FIG. 9 is a plan top view showing a gusseted dish cover on a dish.
Figure 10:
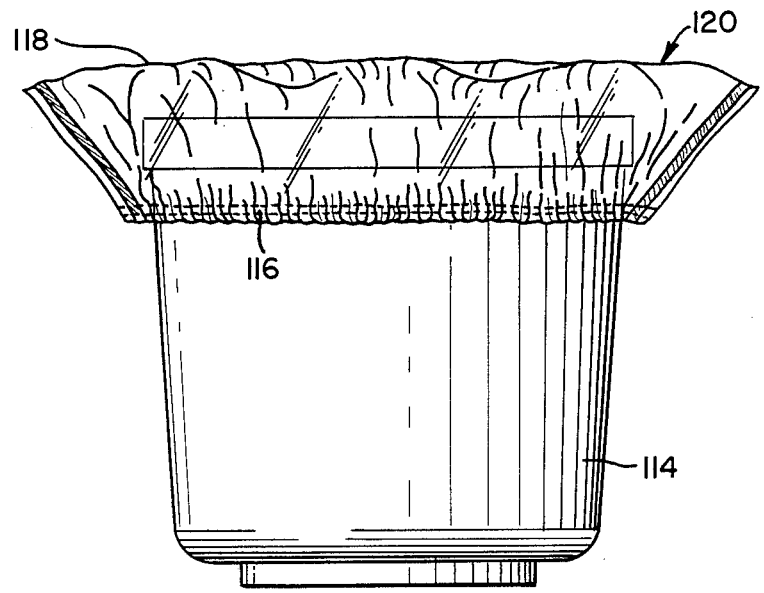
FIG. 10 is a side elevation side view showing a gusseted dish cover on a dish.

FIG. 9 is a plan top view showing dish cover 104 placed upon dish 102 and showing gussets 106 and 110 and having lateral edges 108 and 112. FIG. 10 shows a side elevation view of a gusseted dish cover 120 and a dish 114. Contracted opening 116 contacts the dish and forms a seal while top portion 118 comprises a cover across the mouth of the dish.

While this invention has been described with reference to certain specific embodiments, it will be recognized to those skilled in the art that many variations and embodiments are possible without departing from the scope of the invention.

What is claimed is:

1. A gusseted dish cover comprising a rectangular-shaped blank of flexible sheet material having lateral edges and top and bottom edges and affixed to top and bottom edges thereof an elastic material affixed to said flexible sheet material under tension to provide elongation of the elastic-material over the length of the elastic material, said rectangular-shaped blank of flexible sheet material with affixed elastic material having said top and bottom edges substantially aligned to form a contracted opening having a corrugated surface, means sealing said lateral edges and effecting the center of said sheet material to form a gusset generally parallel to the aligned top and bottom edges to form in cross-section a gusset across said dish cover.

2. The dish cover according to claim 1 wherein said gusset is a generally M-shaped gusset.

3. The dish cover according to claim 1 wherein said flexible sheet material is a thermoplastic material.

4. The dish cover according to claim 3 wherein said thermoplastic material is selected from the group consisting of polyethylene, polypropylene, nylon, polyester, polyvinylacetate, polyvinyl chloride, polyvinylidene chloride, ethylene-vinyl alcohol copolymers and mixtures thereof.

5. The dish cover according to claim 4 wherein said thermoplastic material is polyethylene.

6. The gusseted dish cover according to claim 3 wherein said elastic material is thermally bonded to said thermoplastic material.

7. The dish cover according to claim 3 wherein the means sealing the lateral edges is a heat seal.

8. The dish cover of claim 4 wherein the elastic material is selected from the group of polymers consisting of styrene-butadiene-styrene, styrene-isoprene-styrene, styrene-ethylene/butylene-styrene, styrene-butadiene, styrene-isoprene and styrene-ethylene/propylene and mixtures thereof.

9. The dish cover of claim 1 wherein the flexible sheet material has a thickness between about 0.5 mils (0.013 mm) and about 2 mils (0.052 mm).

10. The dish cover of claim 3 wherein the flexible sheet material has a thickness between 0.5 mils (0.013 mm) and about 2 mils (0.052 mm).

11. The dish cover of claim 1 wherein the elastic material has a thickness between about 1 mil (0.025 mm) and about 5 mils (0.125 mm).

12. An article of manufacture comprising an integrally formed gusseted dish cover formed from a flexible sheet material having a top and a bottom edge and lateral edges with elastic material in an elongated state affixed to the top edge and the bottom edge which are folded substantially aligned to form a contracted opening, means sealing said lateral edges and effecting the center of said flexible sheet material to form a gusset generally parallel to the top and bottom edges to form in cross-section a gusset, said elastic material which when not under tension forms a contracted opening having a corrugated surface where the elastic material is affixed to the flexible sheet material, said gusseted dish cover being spirally wound on a center support means having an end with the contracted opening of said gusseted dish cover being placed in a position off the end of the center support means whereby said elastic material is under substantially no tension.

13. The article according to claim 12 wherein said gusset is a generally M-shaped gusset.

14. The article according to claim 12 wherein said flexible sheet material is a thermoplastic material.

15. The article according to claim 14 wherein said thermoplastic material is selected from the group consisting of polyolefins.

16. The article according to claim 14 wherein said thermoplastic material is selected from the group consisting of polyethylene, polypropylene, nylon, polyester, polyvinylacetate, polyvinyl chloride, polyvinylidene chloride, ethylene-vinyl alcohol copolymers and mixtures thereof.

17. The article according to claim 14 wherein said thermoplastic is polyethylene.

18. The article according to claim 17 wherein said elastic material is thermally bonded to said thermoplastic material.

19. The article according to claim 14 wherein the means sealing the lateral edges is a heat seal.

20. The dish cover of claim 12 wherein the elastic material is selected from the group of polymers consisting of styrene-butadiene-styrene, styrene-isoprene-styrene, styrene-ethylene/butylene-styrene, styrene-butadiene, styrene-isoprene and styrene-ethylene/propylene and mixtures thereof.

21. The dish cover of claim 12 wherein the flexible sheet material has a thickness between about 0.5 mils (0.013 mm) and about 2 mils (0.052 mm).

22. The dish cover of claim 14 wherein the flexible sheet material has a thickness between about 0.5 mils (0.013 mm) and about 2 mils (0.052 mm).

23. The dish cover of claim 12 wherein the elastic material has a thickness between about 1 mil (0.025 mm) and about 5 mils (0.125 mm).

24. The article of claim 12 wherein the contracted opening of the dish cover contacts the corrugated surface of the the contracted opening of the dish cover or of another dish cover.

25. The method for forming a dish cover according to the invention comprising:
(i) providing a generally rectangular sheet of flexible film having a top edge, a bottom edge and two lateral edges;
(ii) affixing under an elongated state an elastic material to the top edge and bottom edge of the generally rectangular sheet of flexible film;
(iii) folding the sheet downward along a first line extending between the lateral edges and medial to and generally parallel to the bottom edge and top edge;
(iv) forming a gusseted dish cover by folding downwardly the top and bottom edges and forming in cross-section a generally M-shaped gusset; and
(v) sealing each lateral edge where it adjoins itself.

26. The method according to claim 25 wherein said flexible sheet material is a thermoplastic material.

27. The method according to claim 26 wherein said flexible sheet material is selected from the group consisting of polyolefins.

28. The method according to claim 26 wherein said flexible sheet material is selected from the group consisting of polyethylene, polypropylene, nylon, polyester, polyvinylacetate, polyvinyl chloride, polyvinylidene chloride, ethylene-vinyl alcohol copolymers and mixtures thereof.

29. The method according to claim 28 wherein said thermoplastic is polyethylene.

30. The method according to claim 27 wherein said elastic material is thermally bonded to said thermoplastic material.

31. The method according to claim 27 wherein the joinder of the lateral edges is provided by a heat seal.

32. The dish cover of claim 25 wherein the elastic material is selected from the group of polymers consisting of styrene-butadiene-styrene, styrene-isoprene-styrene, styrene-ethylene, butylene-styrene, styrene-butadiene, styrene-isoprene and styrene-ethylene/propylene.

33. The dish cover of claim 25 wherein the flexible sheet material has a thickness between about 0.5 mils (0.013 mm) and about 2 mils (0.052 mm).

34. The dish cover of claim 26 wherein the flexible sheet material has a thickness between about 0.5 mils (0.013 mm) and about 2 mils (0.052 mm).

35. The dish cover of claim 25 wherein the elastic material has a thickness between about 1 mil (0.025 mm) and about 5 mils (0.125 mm).

* * * * *

UNITED STATES PATENT AND TRADEMARK OFFICE
CERTIFICATE OF CORRECTION

PATENT NO. : 4,844,248

DATED : July 4, 1989

INVENTOR(S) : Elizabeth Ann Forberg, et al.

It is certified that error appears in the above-identified patent and that said Letters Patent is hereby corrected as shown below:

Column 3, line 40: Delete the word "related" and substitute the word -- relates --.

Column 4, line 68: Following the word "may" delete the word "not".

Column 8, line 2: Delete first occurrence of "of the".

Signed and Sealed this

Fourteenth Day of August, 1990

Attest:

HARRY F. MANBECK, JR.

*Attesting Officer*   *Commissioner of Patents and Trademarks*